United States Patent [19]

Forbush

[11] Patent Number: 4,967,546
[45] Date of Patent: Nov. 6, 1990

[54] MULCHING ATTACHMENT FOR LAWN MOWER

[76] Inventor: Edward Forbush, 1741 Washington, Algonac, Mich. 48001

[21] Appl. No.: 428,935
[22] Filed: Oct. 30, 1989
[51] Int. Cl.$^5$ ............................................. A01D 55/18
[52] U.S. Cl. .......................................... 56/255; 56/295
[58] Field of Search ......... 56/289, 295, 255, 13.5–13.9, 56/12.8, 12.9

[56] References Cited

U.S. PATENT DOCUMENTS

| 3,797,212 | 3/1974 | Pursel | 56/255 |
| 4,083,166 | 4/1978 | Haas | 56/13.7 |
| 4,189,903 | 2/1980 | Jackson et al. | 56/295 X |
| 4,189,904 | 2/1980 | Paker | 56/255 |
| 4,205,510 | 6/1980 | Raniero | 56/295 X |
| 4,205,512 | 6/1980 | Thorud | 56/255 X |

Primary Examiner—Thuy M. Bui
Attorney, Agent, or Firm—Krass & Young

[57] ABSTRACT

A mulching attachment for a lawn mower includes a disc-like base having a fan associated therewith for establishing a radial flow of air thereacross. The mulching attachment further includes a cylindrical blade assembly disposed around the periphery of the disc and including a number of spaced apart blades operative to finely chop vegetation into mulch and to discharge the mulch through openings between the blades. The mulching attachment may be factory installed or retrofitted onto existing lawn mowers.

10 Claims, 2 Drawing Sheets

MULCHING ATTACHMENT FOR LAWN MOWER

Field of the Invention

This invention relates to generally to laWn mowers. Specifically, the invention relates to mulching lawn mowers and more specifically, the invention relates to a mulching attachment for use with a rotary lawn mower.

BACKGROUND OF THE INVENTION

The disposal of leaves, grass clippings and other waste plant material greatly complicates lawn maintenance. If left on a lawn, such materials will decay, forming an unsightly mat which can choke and destroy the lawn. Typically, gardeners remove these materials from lawns either by raking, or by the use of lawn mower attachments which collect such debris. In any instance, the collected leaves, grass clippings and other debris must be disposed. Disposal in a land fill or by burning is generally expensive and derogatory to the environment. Additionally, collection and disposal of plant waste represents a loss of available nutrients. In some instances, gardeners choose to compost plant waste thereby eliminating disposal problems and providing a valuable fertilizer material. Compost piles generally occupy a fairly large amount of space and tend to be malodorous; and hence, they are of limited use, particularly in urban environments.

If plant waste is chopped very finely, it may be directly applied to a lawn without danger of forming a dense mat and harming the lawn. Such finely chopped plant waste is generally referred to as "mulch" and the term "mulching" as used herein, will refer to the pulverizing or macerating of plant material to produce mulch.

It has heretofore been known to equip lawn mowers with variously configured mulching blades which finely chop grass, clippings, leaves and other plant waste. The discharge from such mulcher-equipped mowers may be safely left on a lawn to provide fertilization. U.S. Pat. Nos. 4,083,166; 4,189,903 and 3,797,212 all disclose various auxiliary mulching devices for use with rotary lawn mowers. U.S. Pat. No. 4,189,904 discloses a different design of mulcher wherein a blade bearing member at least partially blocks the outlet chute of a lawn mower restricting discharge of large size clippings. U.S. Pat. No. 4,205,510 describes a nonmulching lawn mower blade comprised of a squirrel cage fan and a number of radial cutters.

Prior art mulching attachments have not enjoyed widespread use owing to a number of problems. Particular of the mulching attachments are large, complex items which can cause severe problems of vibration and generate excessive noise in the course of their use. Additionally, such mulcher attachments are fairly heavy, hard to install, difficult to resharpen and detract from the power of the lawn mower. Mulcher attachments of the type which block discharge chutes are very prone to clog with plant matter and this problem is greatly intensified if the plant matter is even slightly wet.

What is needed is a mulching attachment which may be utilized in combination with a rotary lawn mower and which is simple to install and use, readily resharpened and/or replaced and which is lightweight and small in size so as to eliminate problems of installation, vibration and power loss.

The present invention provides a mulcher attachment for lawn mowers which may be utilized to pulverize grass clippings, leaves and other such plant waste while the lawn is being mowed. The mulcher of the present invention is of a simple design, lightweight and readily installed on existing lawn mowers or it may be incorporated in newly constructed lawn mowers. The mulcher attachment is safe, easy to use and low in cost. These and other advantages of the present invention will be readily apparent from the drawings, discussion and description which follow.

BRIEF DESCRIPTION OF THE INVENTION

There is disclosed herein a mulching attachment for a lawn mower. The mulching attachment comprises a generally planar, disk-shaped member and fan means associated with the disc-shaped member for providing a radial flow of air thereacross. The mulching attachment further includes a generally cylindrical mulcher blade assembly disposed at approximate right angles to, and surrounding the periphery of, the disk. The blade assembly includes a plurality of blades circumferentially spaced thereabout and defining a plurality of spaces therebetween.

In a particular embodiment, the fan means includes one or more planar vanes projecting from the plane of the disc and disposed along a portion of the radius thereof. The fan vanes may be formed from tabs punched from the disc and bent away from the plane thereof. In other embodiments, the mulcher blade assembly may comprise a cylindrical member having a plurality of blades projecting into the interior thereof. The blades may be formed by captive tab portions of the cylindrical wall of the mulcher blade assembly, which tab portions are bent inward.

The mulching attachment may be configured as a two-part device wherein the disc-shaped member and the blade assembly are separate units configured to be fastened together and in one version of such embodiment, the blade assembly includes a flange configured to permit the blade assembly to be mounted to the disc-shaped member.

DETAILED DESCRIPTION OF THE INVENTION

Figure 1:
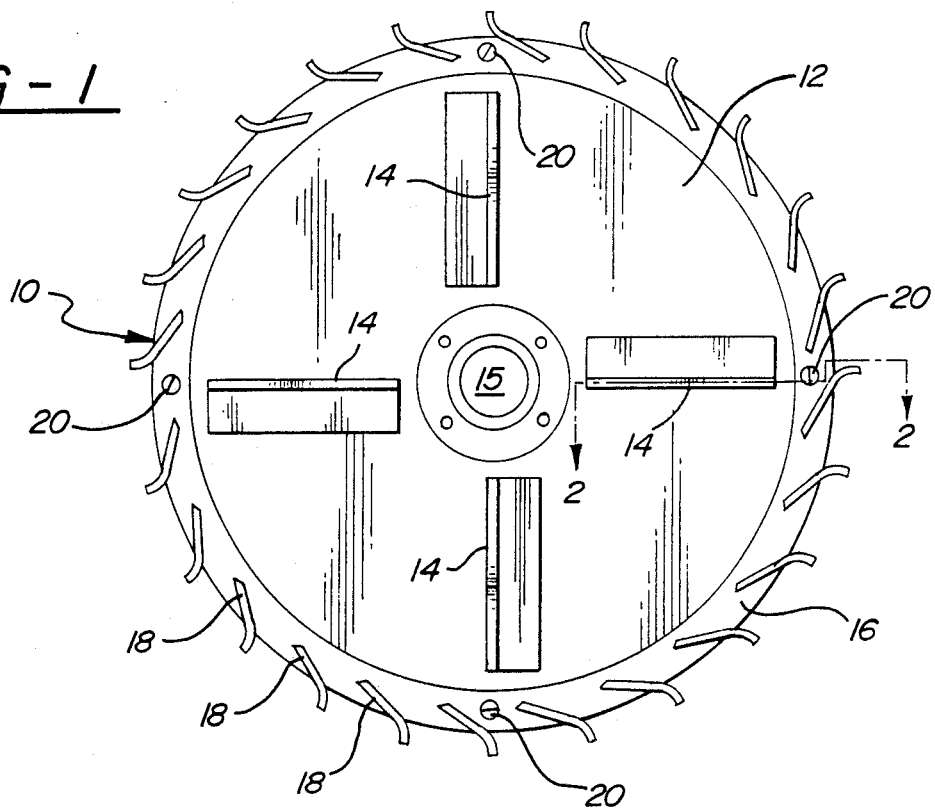
FIG. 1 is a top plan view of a mulching attachment structured in accord with the principles of the present invention.

Referring now to FIG. 1, there is shown a top plan view of one particular mulching attachment 10 structured in accord with the principles of the present invention. The mulching attachment 10 of FIG. 1 includes a generally planar disc-shaped member 12 which has a plurality of fan vanes 14 radially disposed thereupon.

The mulching attachment 10 further includes a mulcher blade assembly 16 disposed about the circumference of the disc-shaped member 12 and including a number of mulching blades 18 thereupon. As depicted, the mulcher blade assembly 16 is fabricated as a separate member which is affixed to the disc-shaped member 12 by bolts 20. It will also be noted that the mulcher attachment 10 includes a central opening 15 configured to mount the attachment onto the drive shaft of a lawn mower.

In operation, the entire mulching attachment 10 is rotated as a unit by the lawn mower motor and the fan vanes 14 provide a radial flow of air across the disk. It should be noted that by "radial flow of air" is meant a flow of air which passes across the face of the disc-shaped member 12 to the outer circumference thereof. It should also be noted that while the fan vanes 14 of the FIG. 1 embodiment are shown as being generally disposed along the radii of the disc 12, it may be advantageous in some instances to dispose the vanes in other orientations, as for example at angles to the radii. It will also be appreciated that other fan means, such as a propeller type fan or a squirrel cage fan, may be similarly employed in the present invention provided that the proper radial flow of air is established. The fan vanes 14, in this embodiment, are formed by captive tabs partially cut from the disc-shaped member 12 and bent out of the plane thereof. This is a simple method for providing fan vanes although it will be appreciated that in some instances the fan may be fabricated as a separate member which is affixed to the disc-shaped member.

The radial flow of air carries grass clippings, leaves and other plant waste to the mulching blades 18 which serve to finely chop or macerate the plant material. The blades 18, as will be explained in greater detail hereinbelow, define a plurality of relatively small openings therebetween and these openings constrain plant material within the mulcher 10 until such time as it is finely chopped. In the depicted embodiment, the mulcher blades 18 are shown as being inclined into the interior of the mulching attachment, although it will be appreciated that various other blades, designs and dispositions may be similarly employed.

Figure 2:
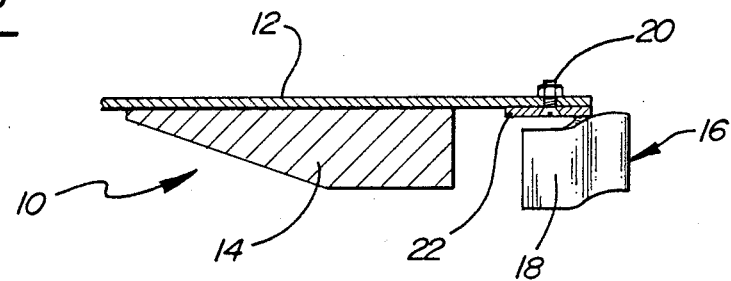
FIG. 2 is a sectional view of the mulching attachment of FIG. 1 taken along lines II—II.

Referring now to FIG. 2, there is shown a cross-sectional view of the mulcher attachment 10 of FIG. 1, taken along lines II—II. The FIG. 2 illustration better shows the fan vanes 14 and the manner in which they project from the disc-shaped member 12. The FIG. also illustrates clearly, a portion of the mulcher blade assembly 16, showing one of the mulcher blades 18 and a bolt 20 which mounts a flange portion 22 of the mulcher blade assembly 16 to the disc-shaped member 12. It will be appreciated that means other than a bolt, such as rivets, clamps, clips, welds and the like may be similarly employed. It will also be appreciated that in some instances, the disc-shaped member 12 and mulcher blade assembly 16 may be fabricated as a single unitary unit; although, it has been found that by manufacturing the mulcher attachment as a two component item, replacement of the mulcher blades 18 is greatly facilitated.

Figure 3:
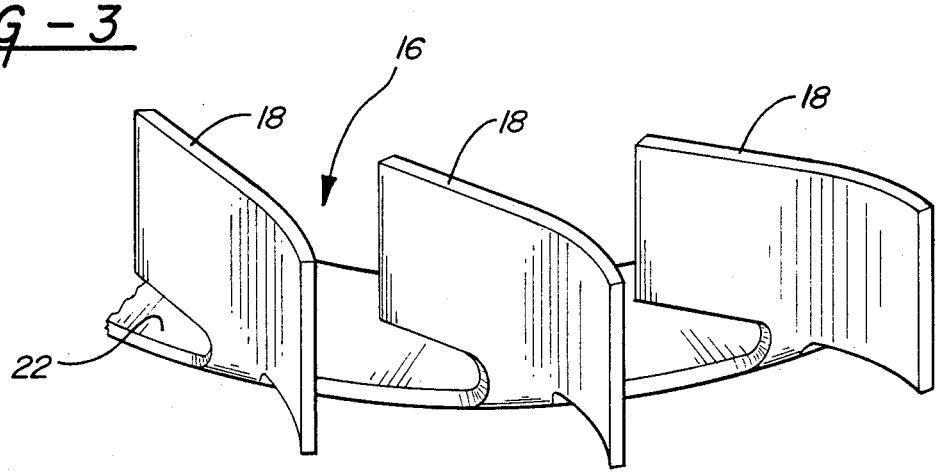
FIG. 3 is a perspective view of a portion of a mulcher blade assembly structured in accord with the principles of the present invention.

Referring now to FIG. 3 there is shown a portion of a mulcher blade assembly 16 structured in accord with the principles of the present invention. This assembly is configured as a generally cylindrical member having a plurality of mulcher blades 18 and also including a mounting flange 22 for attachment of the assembly 16 to the disc-shaped member, as noted hereinabove. In the FIG. 3 embodiment, the mulcher blades 18 are fabricated by cutting captive tabs from the cylindrical wall and turning these tabs inward. Optionally, the leading edges of the tabs may be sharpened and/or hardened. It will also be noted that in the illustrated embodiment, the tabs are cut so as to extend along the entire length of the cylindrical wall down to the flange 22. In other embodiments, the tabs may be formed from only a portion of the wall so as to leave a top and/or a bottom, reinforcement rail on the assembly 16.

It should be noted that the configuration of the blade assembly 16 of FIG. 3 provides a number of open spaces between the blades and these spaces permit egress of chopped vegetable debris. It has been found that, to some degree, the size of these openings will influence the degree of fineness with which the vegetation is chopped. Relatively large openings will permit coarsely chopped materials to exit whereas relatively small openings will cause vegetation to be retained longer and hence chopped finer.

Figure 4:
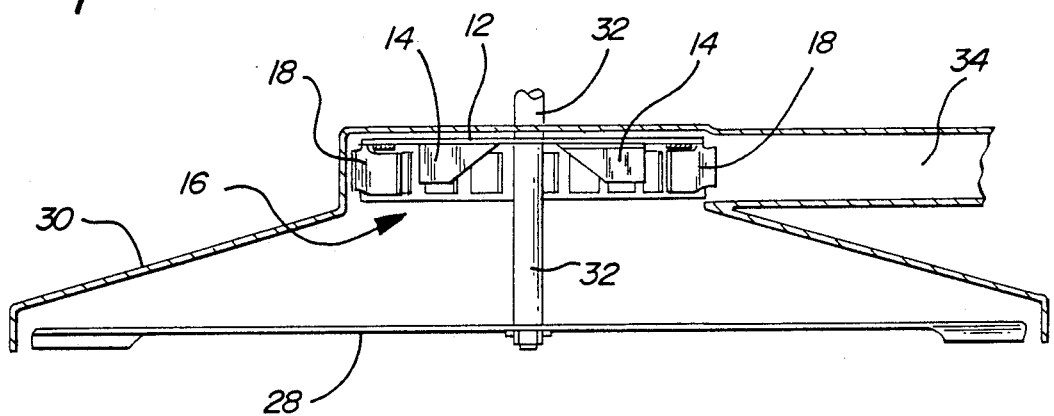
FIG. 4 is a schematic, cut-away view of a lawn mower showing the mulcher attachment of the present invention disposed therein.

Referring now to FIG. 4, there is shown a cut-away view of one configuration of rotary lawn mower including the mulcher attachment of the present invention therein. The FIG. 4 mower includes a mower blade 28 disposed within a blade housing 30 and rotated by a drive shaft 32 which is turned by a motor, (not shown). In the FIG. 4 embodiment, the mulcher attachment 16 is disposed within a particularly configured upper portion of the mower blade housing and in general it is anticipated that this particular embodiment will be a factory-manufactured item.

As is shown in the FIG., the mulcher attachment 16 includes fan vanes 14 and mulcher blades 18 supported by a disc-shaped member 12. The mulcher attachment 16 is mounted in a top portion of the funnel-shaped housing so as to create a suction which will draw grass clippings and leaves upwards into the housing and radially convey those clippings to the mulcher blade 18. The discharge chute 34 of the mower is placed so that all clippings must pass through the mulcher attachment 16 before exit.

Figure 5:
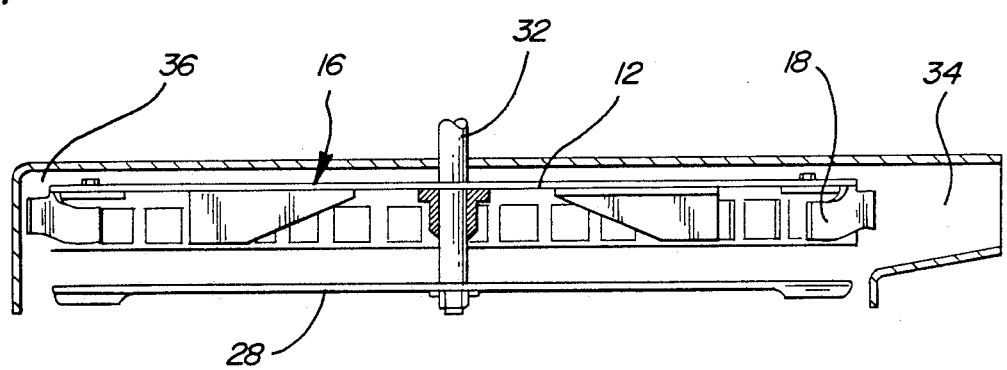
FIG. 5 is a schematic cut-away view of another lawn mower showing an alternative method of mounting the mulching attachment of the present invention.

Referring now to FIG. 5, there is shown another embodiment of the present invention wherein the mulching attachment 16 of the present invention is disposed upon a preexisting rotary-type lawn mower. In such mounting, the mower blade housing 36 is not specifically configured to accommodate the attachment. Since it is desirable that substantially all of the grass clippings and other debris be passed through the mulching attachment; and since in the FIG. 5 embodiment the housing is not funnel-shaped, it is necessary that the mulching attachment be of a diameter corresponding to that of the mower blade 28. In this embodiment, the mulching attachment 16 is generally similar to that previously described but for diameter. The mulching attachment 16, in the FIG. 5 embodiment, creates a radial flow of air across the disc-shaped member 12 thereof, which flow of air carries grass clippings and other debris to the mulching blades 18, from which they exit to the discharge chute 34 as in the previous embodiment.

Figure 5A:
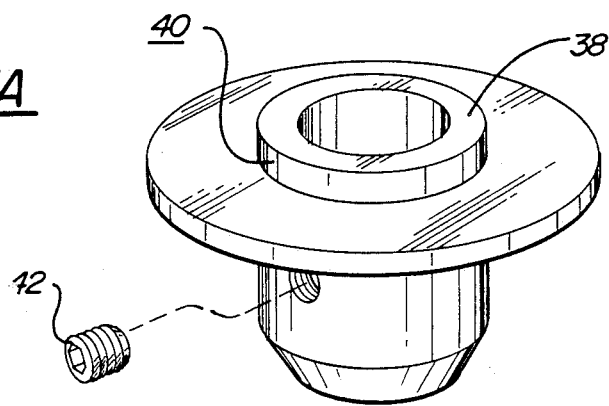
FIG. 5A is a perspective view of a mounting collar which may be utilized in the FIG. 5 embodiment to mount the mulcher blade assembly into a lawn mower.

In order to retrofit an existing lawn mower with the mulching attachment 16 of the present invention, it may be necessary to include a mounting collar or similar item of hardware for purposes of retaining the mulching attachment 16 on the motor shaft 32 of the mower. FIG. 5A depicts one such mounting collar 38, which is configured to include a central socket 40 adapted to receive the motor shaft 32 and further including a set screw 42 for locking the collar 38 against the shaft 32. The mounting collar 38 is either fabricated to be integral with the mulching attachment or may be keyed so as to engage the central aperture thereof and prevent the attachment from slipping on the shaft. Obviously, various other attachment means will be readily apparent to one of skill in the art and may be adapted for the present invention.

In particular embodiments, the mulching attachment of the present invention may be fabricated from metal stock such as steel or non-ferrous metals. Ideally, the material from which the mulching attachment is fabricated should be relatively durable, easy to shape and fairly light in weight. Also, the mulcher blades should be fairly hard so as to resist damage by twigs, stones and like material. If the mulching attachment is fabricated as a dual-membered unit having a separate disc and blade assembly, it is possible to employ a relatively hard material such as hardened steel and the like for the mulching blades while utilizing a lower cost and/or easier to fabricate material such as mild steel for the disc-shaped member and fan blades. Obviously, many other materials, including high strength polymers such as glass-filled polyamides and the like may be employed to fabricate all or part of the assembly.

Obviously, many variations of the present invention may be prepared in accord with the teachings herein. For example, while the blade assembly is shown as a right cylindrical member extending at approximately 90 degree angles to the disc-shaped member, the blade assembly may in some instances be inclined at an angle greater or less than 90 degrees to the plane of the disc-shaped member and for this reason it is to be understood that the "generally cylindrical" mulcher blade assembly is meant to include all such variants wherein the mulcher blade assembly is disposed at some angle to the disc-shaped member. It is also to be understood that the mulcher blades themselves may be configured other than is exactly shown herein. For example, the leading edges of the blades may be serrated, saw-toothed or otherwise configured and the blade assembly may include blades of various sizes and/or blades disposed in staggered relationship. All such embodiments are considered within the general scope of the present invention insofar as they include a plurality of blades disposed about the circumferential periphery of a generally planar member and operative in cooperation with fan means to mulch vegetable waste.

In light of the foregoing, it is apparent that the preceding drawings, discussion and description are merely meant to be illustrative of particular embodiments of the present invention and are not meant to be limitations upon the practice thereof. It is the following claims, including all equivalents, which define the scope of the invention.

I claim:

1. A mulching attachment for a lawn mower comprising:
    a generally planar, disc-shaped member;
    fan means associated with the disc-shaped member for providing a radial flow of air thereacross;
    a generally cylindrical mulcher blade assembly disposed at approximate right angles to, and surrounding the periphery of, the disc; said blade assembly including a plurality of blades circumferentially spaced thereabout and defining a plurality of spaces therebetween.

2. A mulching attachment as in claim 1, wherein said fan means includes at least one planar vane which projects from the plane of the disc and is disposed along a portion of the radius thereof.

3. A mulching attachment as in claim 2, wherein said fan means comprises a plurality of said vanes, each vane formed by a captive tab cut from the disc and bent out of the plane thereof.

4. A mulching attachment as in claim 1, wherein said blade assembly comprises a cylindrical member having a plurality of blades projecting into the interior thereof.

5. A mulching attachment as in claim 4, wherein said blades are formed by captive tab portions of the cylindrical wall which are bent inward therefrom.

6. A mulching attachment as in claim 1, wherein said mulcher blade assembly is separate from the disc-shaped member and further includes a flange portion configured to mount the cutter blade assembly onto the disc-shaped member.

7. A mulching attachment as in claim 6, wherein said flange includes a plurality of holes therein and said disc includes a plurality of corresponding holes, said mulching attachment further including mounting means configured to pass through the holes and affix the mulcher blade assembly to the disc.

8. A mulching attachment for a lawn mower comprising:
    a generally planar, disc-shaped member configured to include a plurality of generally planar, fan vanes radially disposed thereupon, said vanes configured to establish a radial flow of air across the disc-shaped member when it is rotated;
    a generally cylindrical wall member disposed proximate the periphery of the disc-shaped member, and at approximate right angles to the plane thereof, said wall member including a plurality of mulcher blades circumferentially spaced thereabout and projecting inwardly therefrom and a plurality of openings defined between said blades; whereby said mulching attachment is configured to establish a radial flow of air across the disc-shaped member, past said blades and through the openings so that plant material entrained by the air flow is cut into mulch.

9. A mulching attachment as in claim 1, wherein said mulcher blade assembly is integral with the disc-shaped member.

10. A mulching attachment as in claim 8, wherein the mulcher blade assembly and disc-shaped member are discrete items, and wherein said mulching attachment includes means for affixing the mulcher blade assembly to the disc-shaped member.

* * * * *